3,298,853
WATER-INSOLUBILIZING STARCH-CLAY PAPER COATINGS WITH A REACTION PRODUCT OF DIALDEHYDE STARCH AND A DICYANDIAMIDE FORMALDEHYDE CONDENSATION PRODUCT
Mitchell Frank Zienty, Elkhart, Ind., assignor to Miles Laboratories, Inc., Elkhart, Ind., a corporation of Indiana
No Drawing. Filed June 3, 1963, Ser. No. 284,808
3 Claims. (Cl. 117—62.2)

This invention relates to paper coating compositions having improved wet rub resistance and to a process for making such compositions. More particularly, this invention concerns the water-insolubilization of a starch-clay paper coating composition to improve the wet rub resistance of the coating composition.

In paper coating compositions containing a clay pigment, materials such as protein and starch are used to bind the clay particles together and to provide an adhesive for adherence of the clay to the surface of the paper. Starch is a preferred material because of its relatively low cost in comparison to protein. Because starch is highly water soluble, however, a substantial amount of a starch-clay paper coating will readily rub off when the coated papers are subjected to extreme moisture conditions, such as that encountered in offset printing and in the printing of cover and label stock and container boards. For this reason the resistance of paper coatings, particularly pigmented coatings, to abrasion and scuffing when wet is a highly desirable property. This property is generally known in the paper making art as wet rub resistance.

Previous attempts to improve the wet rub resistance of starch-clay paper coatings have included the use of formaldehyde as a relatively inexpensive material for water-insolubilizing the starch adhesive in paper coatings. However, certain properties of formaldehyde make this product undesirable as a water-insolubilizing agent in paper coatings. For example, the noxious vapors of formaldehyde, particularly at high drying temperatures, not only make it unpleasant to work with, but present somewhat of a health hazard. Another disadvantage of using formaldehyde as a water-insolubilizing agent for paper coatings is that such coatings require prolonged curing periods in order to attain sufficient wet rub resistance.

Accordingly, a primary object of the present invention is to provide a water-insolubilized starch-clay paper coating which has wet rub resistance superior to that of prior art coatings.

Another object of the invention is to provide a relatively inexpensive water-insolubilizing agent for starch-clay paper coatings which does not have the disadvantages of the prior art insolubilizing materials.

Still another object of the invention is to provide an improved process for effecting water-insolubilization of a starch-clay paper coating.

The present invention is based on the discovery that a reaction product of a dialdehyde polysaccharide and a dicyandiamide-formaldehyde condensation product when reacted with a starch-clay paper coating composition, for example as an aqueous dispersion applied to a paper-borne starch-clay coating, is highly effective in water-insolubilizing such coating to thereby provide said coating with excellent wet rub resistance.

The dialdehyde polysaccharide insolubilizing material of this invention may be a dialdehyde derivative of any of a number of polysaccharides, such as corn starches, wheat starches, potato starches, rice starches, tapioca starches, celluloses, gums, dextrans, inulins, and the like.

Dialdehyde polysaccharides are generally obtained by oxidation of the appropriate polysaccharide with periodic acid, in accordance with conventional methods well known to the art. The conversion of a polysaccharide to a dialdehyde polysaccharide by oxidation with periodic acid is more clearly illustrated, in the case of starch, in the folowing equation:

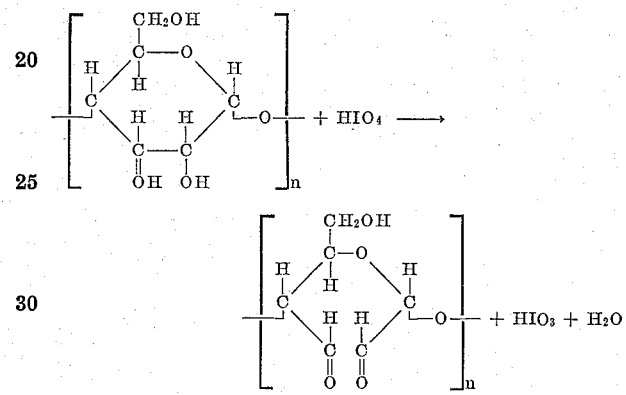

where $n$, the number of repeating structural units, may vary from as few as ten to as many as several thousand. More recently, electrolytic procedures have been used to effect such oxidation, as exemplified by U.S. Patent No. 2,648,629 to William Dvonch and Charles L. Mehltretter, and U. S. Patents No. 2,713,553, No. 2,770,589 and No. 2,830,941 to Charles L. Mehltretter.

In the practice of this invention it is preferred to use a dialdehyde polysaccharide which is from about 90% to 100% oxidized, that is, one in which about 90 to 100 out of each 100 of the original anhydroglucose units of the starch molecule have been converted to dialdehyde units. A particularly preferred product is a dialdehyde starch commercially available under the name Sumstar-190. This product is a 95% oxidized dialdehyde derivative of corn starch, containing about 10% moisture, which is obtained by periodate oxidation of corn starch in accordance with well known methods as described above.

For the dicyandiamide-formaldehyde insolubilizing material of this invention any commercially available condensation product of dicyandiamide and formaldehyde may be used, for example, a product sold under the name Lyofix.

A typical starch-clay paper coating composition, as employed in the practice of this invention, consists of a mixture of starch and clay in which the solids content of the composition, that is, the total amount of starch and clay, comprises from about 32% to 40% based on the total weight of the composition and the amount of starch adhesive comprises from about 12% to 18% based on the total weight of the clay.

Starches which may be used for the starch adhesive of the coating composition include various raw and acid-modified starches such as corn starches, sorghum starches, milo starches and the like. For the clay pigment of the coating composition, any of the commercially available papermaking clays, particularly clays of the kaolin group, are operable in the present concept. The preferred clay pigment is a hydrated aluminum silicate such as the product sold under the name Lustra clay.

Although the water insolubilizing action of the reaction product of dialdehyde polysaccharide and dicyandiamide-formaldehyde condensation product on starch-clay paper coatings is not completely understood, it is believed to be due to a reaction between said reaction product, which is in the form of a complex resin polymer, and the starch adhesive of the coating composition through hydrogen bonding between chemically reactive aldehyde and methylol groups of the polymeric resin material and hydroxyl groups of the starch adhesive. The resulting reaction products are high molecular weight polymers which are nearly insoluble or only slightly soluble in water. When the reaction product of dialdehyde polysaccharide and dicyandiamide-formaldehyde condensation product is applied to the surface of a starch-clay paper coating in the form of an aqueous dispersion the hydrogen bonding effect is believed to occur primarily at the surface of the paper coating composition. In other words those hydroxyl groups of the starch adhesive which lie on the surface of the coating compositions are more readily accessible for reaction with the dialdehyde polysaccharide - dicyandiamide - formaldehyde insolubilizer than are the hydroxyl groups of the starch adhesive which lie underneath the surface. The net result, therefore, is the provision of a particularly pronounced surface insolubilization of the paper coating composition, or put in another way, the provision of an insolubilized surface layer which imparts the excellent wet rub resistance exhibited by these treated coatings.

In accordance with the inventive concept it has been found that an aqueous dispersion of a combination of, for example, dialdehyde starch (Sumstar–190) and dicyandiamide-formaldehyde condensation product (Lyofix), wherein the solids content of the solution consists of from about 7% to 10% by weight dialdehyde starch and from about 0.5% to 10% by weight dicyandiamide-formaldehyde condensation product, based on the total volume of the insolubilizing dispersion, provides a highly effective water-insolubilizing material for a starch-clay paper coating.

The insolubilizing dispersion, in a preferred embodiment, is prepared by admixing a 10% aqueous dispersion of dialdehyde polysaccharide with a 30% aqueous solution of dicyandiamide-formaldehyde condensation product in sufficient amounts to give the desired solids concentration. The mixing may advantageously be accomplished at room temperature, with stirring for from about 10 minutes to 15 minutes to obtain complete dispersion of the solids in solution.

The following examples serve to illustrate the invention, but are not to be construed as limiting the scope thereof:

EXAMPLE 1

A clay slip was prepared by adding to a beaker containing 180 ml. of distilled water 200 g. of Lustra clay, in small portions, and 1.0 g. of disodium phosphate, as a dispersing aid. The mixture was mechanically stirred until dispersion of the clay was complete. After all the clay had been added, stirring was continued for 45 minutes at room temperature until the mixture became smooth. In the meantime, 36 g. of a thin boiling white milo starch (Tex-O-Film No. 6088) was slurried in 170 g. of water and the starch was dispersed, with stirring, on a boiling water bath. The starch dispersion was then cooled at 25° C. The clay slip and starch dispersion were then combined and stirred mechanically for 45 minutes until the composition became smooth.

The pH of the coating composition was maintained at about pH 7.0, as determined by measurement with a glass electrode. Selection of this pH level is based on prior art experience wherein it has been found that printing inks will adhere best to coating surfaces which are neutral or only slightly alkaline. An additional consideration is the sensitivity of the dialdehyde polysaccharide insolubilizing material of this invention to highly alkaline conditions.

Two samples of the starch-clay paper coating formulation of this example were then applied to two separate sheets of 8½ in. x 11 in. paper stock with a paint brush and the excess was removed by drawing down with a No. 18 Mayer rod. The coatings were then allowed to dry at room temperature for from about 30 minutes to 60 minutes.

After the paper coatings had thoroughly dried, a water-insolubilizing material comprising an aqueous dispersion containing a solids content of 10% by weight dialdehyde starch and 10% by weight dicyandiamide-formaldehyde condensation product, based on the total volume of the insolubilizing dispersion, was then applied to the surface of each of the coatings at the nip of a household wringer.

The insolubilizing dispersion was prepared by admixing 100 ml. of a 10% aqueous dispersion of dialdehyde starch (Sumstar–190) with 33.3 ml. of a 30% aqueous dispersion of dicyandiamide-formaldehyde condensation product (Lyofix) in accordance with the procedure described hereinabove.

The insolubilized paper coatings were then cured in an oven, one coating being cured at 140° F. for 10 minutes and the other coating being cured at 200° F. for 2 minutes. The aforementioned curing temperatures were selected as representative of commercial "on machine" curing conditions.

As a control, two samples of the starch-clay paper coating formulation of this example were also applied to paper stock and dried and cured in accordance with the procedure described hereinabove, with the exception that no insolubilizing material was applied to the surface of the control coatings.

The wet rub resistance of the insolubilized coatings and the control coatings was then tested by a semi-quantitative finger wet rub method, which consists generally of placing a quantity, for example, three drops, of distilled water on the coated surface at three different locations, each at the same distance from an edge of the sheet, and allowing each water deposit to stand for a separate time interval, for example, 10 seconds, 30 seconds and 60 seconds, respectively. At the end of each time interval the water in each of said deposits was brushed with the index finger across the sheet toward and over said edge and onto a smooth, black, non-absorbent paper, using ten strokes on the wet surface of the coating at a consistent finger pressure. After the coating which rubbed off on the black test sheets was allowed to dry, it appeared as white streaks against the black background of the test sheets.

The numerical data set out in Table 1 below represent the degree of wet rub-off of the coating compositions of this example, that is, the water-insolubilized coatings and the control coatings (coatings not insolubilized). The degree of wet rub-off corresponding to each of the numerical values is designated by the following legend:

0—No rub off
1—Slight rub off
2—Moderate rub off
3—Complete rub off

TABLE 1

*Paper coating composition of Example 1*

| Insolubilizer | Wet ruboff of coating composition cured at 140° F. for 10 min. | | | Wet ruboff of coating composition cured at 200° F. for 2 min. | | |
|---|---|---|---|---|---|---|
| | Time (in seconds) | | | | | |
| | 10 | 30 | 60 | 10 | 30 | 60 |
| *Aqueous dispersion of 10% dialdehyde starch and 10% dicyandiamide-formaldehyde condensation product | 0 | 0 | 0 | 0 | 0 | 0 |
| Control (No insolubilizer applied to coating composition) | 3 | 3 | 3 | 3 | 3 | 3 |

* Percentages=Percent by weight solids based on total volume of dispersion.

EXAMPLE 2

A paper coating composition was prepared according to the procedure of Example 1, using 36 g. of a hypochlorite-oxidized corn starch (Claro No. 5591) as the starch adhesive.

Two samples of the paper coating composition of this example were then applied to paper stock and dried in accordance with the procedure described in Example 1.

After the paper coatings had thoroughly dried, a water-insolubilizing material comprising an aqueous dispersion containing a solids content of 7% by weight dialdehyde starch and 3% by weight dicyandiamide-formaldehyde condensation product, based on the total volume of the insolubilizing dispersion, was then applied to the surface of each of the coatings at the nip of a household wringer.

The insolubilizing dispersion was prepared by admixing 70 ml. of a 10% aqueous solution of dialdehyde starch (Sumstar–190) with 10 ml. of a 30% aqueous solution of dicyandiamide-formaldehyde condensation product (Lyofix) in accordance with the procedure described hereinbefore.

As a control, two samples of the coating composition were also applied to paper stock and the coatings were dried and cured in accordance with the conditions described in Example 1.

The wet rub resistance of the paper coatings of this example are set out in Table 2 below. The numerical values in the table represent the degree of wet rub-off of the respective coatings in accordance with the legend designated in Example 1.

EXAMPLE 3

A paper coating composition was prepared according to the procedure of Example 1, using 36 g. of a hypochlorite-oxidized corn starch (Claro No. 5591) as the starch adhesive.

Two samples of the paper coating composition of this example were then applied to paper stock and dried in accordance with the procedure described in Example 1.

After the paper coatings had thoroughly dried, a water-insolubilizing material comprising an aqueous dispersion containing a solids content of 10% by weight dialdehyde starch and 0.5% by weight dicyandiamide-formaldehyde condensation product, based on the total volume of the insolubilizing dispersion, was then applied to the surface of each of the coatings at the nip of a household wringer.

The insolubilizing dispersion was prepared by admixing 100 ml. of a 10% aqueous dispersion of dialdehyde starch (Sumstar–190) with 1.7 ml. of a 30% aqueous solution of dicyandiamide-formaldehyde condensation product (Lyofix) in accordance with the procedure described hereinbefore.

As a control, two samples of the coating composition were also applied to paper stock and the coatings were dried and cured in accordance with the conditions described in Example 1.

The wet rub resistance of the paper coatings of this example are set out in Table 3 below. The numerical values in the table represent the degree of wet rub-off of the respective coatings in accordance with the legend designated in Example 1.

TABLE 2

*Paper coating composition of Example 2*

| Insolubilizer | Wet ruboff of coating composition cured at 140° F. for 10 min. | | | Wet ruboff of coating composition cured at 200° F. for 2 min. | | |
|---|---|---|---|---|---|---|
| | Time (in seconds) | | | | | |
| | 10 | 30 | 60 | 10 | 30 | 60 |
| * Aqueous dispersion of 7% dialdehyde starch and 3% dicyandiamide-formaldehyde condensation product | 1 | 2 | 2 | 0 | 1 | 1 |
| Control (No insolubilizer applied to coating composition) | 3 | 3 | 3 | 3 | 3 | 3 |

*Percentages=Percent by weight solids, based on total volume of dispersion.

TABLE 3

*Paper coating composition of Example 3*

| Insolubilizer | Wet ruboff of coating composition cured at 140° F. for 10 min. | | | Wet ruboff of coating composition cured at 200° F. for 2 min. | | |
|---|---|---|---|---|---|---|
| | Time (in seconds) | | | | | |
| | 10 | 30 | 60 | 10 | 30 | 60 |
| * Aqueous dispersion of 10% dialdehyde starch and 0.5% dicyandiamide-formaldehyde condensation product | 1 | 2 | 2 | 1 | 1 | 1 |
| Control (No insolubilizer applied to coating composition) | 3 | 3 | 3 | 3 | 3 | 3 |

\* Percentages=Percent by weight solids based on total volme of disperson.

It is to be noted from the wet rub data of the foregoing examples that one test sheet was produced for each of the insolubilized coating compositions of the respective examples as well as a similar test sheet for each of the corresponding control compositions. Each test sheet thus contained six rub-off specimens consisting of two groups, respectively, demonstrating the wet rub-off of a paper coating produced by curing samples of the same coating composition under two different time-temperature conditions and by performing the rub-off test at three different time intervals, as described in Example 1.

The test sheets for each of the compositions of Examples 1 to 3 were placed in side-by-side relation with the test sheets for the corresponding control compositions. A visual comparison of the respective sheets showed that in every instance the wet rub specimens for the control compositions were much more dense than the wet rub specimens of paper coating insolubilized according to the practice of this invention. The obvious difference in density thus presents clear evidence of the superior wet rub resistance of the insolubilized coatings of this invention in contrast to the corresponding coating compositions which were not insolubilized.

In summary, the present invention is directed to water-insolubilized starch-clay paper coatings having improved wet rub resistance, to improved paper products coated therewith and to a process for making the improved coatings. More specifically, the inventive concept is directed to the application of an aqueous dispersion of a reaction product of a dialdehyde polysaccharide and a dicyandiamide-formaldehyde condensation product to the surface of a starch-clay paper coating as a means for improving the wet rub resistance of the coating. The preferred insolubilizing dispersion contains a solids content of from about 7% to 10% by weight dialdehyde polysaccharide and from about 0.5% to 10% by weight dicyandiamide-formaldehyde condensation product, based on the total volume of the insolubilizing dispersion.

What is claimed is:

1. A coated paper product having improved wet rub resistance comprising a paper substrate, a base coating overlaying a surface of said substrate and comprising a mixture of clay and a starch adhesive, and a surface layer on said base coating comprising a mixture of clay and the reaction product of the starch adhesive with an aqueous dispersion of a reaction product of a dialdehyde starch and a dicyandiamide-formaldehyde condensation product, said aqueous dispersion having a solids content of from about 7% to about 10% by weight dialdehyde starch and from about 0.5% to about 10% by weight dicyandiamide-formaldehyde condensation product, said percentages based on the total volume of the dispersion.

2. A process for improving the wet rub resistance of a paper-borne clay-starch adhesive coating composition which comprises applying to the surface of said coating composition an aqueous dispersion consisting essentially of the reaction product of a dialdehyde starch and a dicyandiamide-formaldehyde condensation product, said aqueous dispersion having a solids content of from about 7% to about 10% by weight dialdehyde starch and from about 0.5% to about 10% by weight dicyandiamide-formaldehyde condensation product, said percentages based on the total volume of the dispersion.

3. A composition adapted to impart improved wet rub resistance to clay-starch adhesive coating compositions consisting essentially of an aqueous dispersion of the reaction product of a dialdehyde starch and a dicyandiamide-formaldehyde condensation product, said aqueous dispersion having a solids content of from about 7% to about 10% by weight dialdehyde starch and from about 0.5% to about 10% by weight dicyandiamide-formaldehyde condensation product, based on the total volume of the dispersion.

References Cited by the Examiner

UNITED STATES PATENTS

| 2,515,340 | 7/1950 | Fisher et al. | 117—156 X |
| 2,738,074 | 3/1956 | Valente | 117—156 X |
| 2,988,455 | 6/1961 | Rosenberg et al. | 106—210 X |
| 3,002,881 | 8/1961 | McDonnell et al. | 162—167 X |
| 3,024,212 | 3/1962 | Paschall et al. | 117—156 X |
| 3,090,699 | 5/1963 | Bulson | 117—62.2 |
| 3,137,588 | 6/1964 | Taylor | 117—62.2 |
| 3,145,116 | 8/1964 | Zienty | 106—210 |
| 3,169,076 | 2/1965 | Borchert | 117—155 |

OTHER REFERENCES

Azite 900 Liquifier, American Cyanamid Co., Technical Bulletin No. 21-A, 1951, pp. 1-3, 21, 22.

WILLIAM D. MARTIN, *Primary Examiner.*

H. W. MYLIUS, *Assistant Examiner.*